United States Patent
Hirayama

(10) Patent No.: US 9,951,849 B2
(45) Date of Patent: Apr. 24, 2018

(54) CHAIN GUIDE

(71) Applicant: TSUBAKIMOTO CHAIN CO., Osaka-shi, Osaka (JP)

(72) Inventor: Manabu Hirayama, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 192 days.

(21) Appl. No.: 15/088,918

(22) Filed: Apr. 1, 2016

(65) Prior Publication Data

US 2016/0290449 A1 Oct. 6, 2016

(30) Foreign Application Priority Data

Apr. 3, 2015 (JP) ................................. 2015-077024

(51) Int. Cl.
*F16H 7/08* (2006.01)
*F16H 7/18* (2006.01)

(52) U.S. Cl.
CPC ......... *F16H 7/18* (2013.01); *F16H 2007/185* (2013.01)

(58) Field of Classification Search
CPC ...... F16H 7/18; F16H 2007/0872; F16H 7/08; F16H 2007/0804; F16H 2007/0825
USPC ....................................................... 474/111
See application file for complete search history.

(56) References Cited

U.S. PATENT DOCUMENTS

| | | | | |
|---|---|---|---|---|
| 5,318,482 A * | 6/1994 | Sato | ........................ | F16H 7/08 474/111 |
| 6,758,777 B2 * | 7/2004 | Young | ...................... | F16H 7/18 474/111 |
| 6,939,259 B2 * | 9/2005 | Thomas | .................... | F16H 7/18 474/111 |
| 7,118,503 B2 * | 10/2006 | Shum | ...................... | F16H 7/08 474/111 |
| 7,137,916 B2 * | 11/2006 | Kurohata | .................. | F16H 7/18 474/111 |
| 7,476,168 B2 * | 1/2009 | Markley | ............... | F16H 7/0829 474/111 |
| 7,476,169 B2 * | 1/2009 | Konno | ..................... | F16H 7/18 474/111 |

(Continued)

FOREIGN PATENT DOCUMENTS

| | | |
|---|---|---|
| CN | 1831374 A | 9/2006 |
| JP | 2006-242357 A | 9/2006 |

(Continued)

*Primary Examiner* — Henry Y Liu
(74) *Attorney, Agent, or Firm* — Westerman, Hattori, Daniels & Adrian, LLP

(57) ABSTRACT

A chain guide is provided, which can readily achieve, with a simple structure, both favorable attachability and tightness of a guide shoe relative to a base member, even though the base member has side wall ribs on both left and right side edges. A base member of a chain guide includes an upstream engagement portion and downstream engagement-portions, while a guide shoe includes an upstream hook and downstream hooks. Downstream engagement portions include restricting portions. The downstream hooks are hooked to the downstream engagement portions from an outer side in a guide width direction by twisting and elastically deforming the guide shoe in a state where the upstream hook is engaged with the upstream engagement portion.

8 Claims, 5 Drawing Sheets

(56) References Cited

U.S. PATENT DOCUMENTS

| | | | |
|---|---|---|---|
| 7,524,254 B2* | 4/2009 | Konno | F16H 7/18 474/111 |
| 7,951,029 B2* | 5/2011 | Oota | F16H 7/18 474/111 |
| 7,967,708 B2* | 6/2011 | Hayami | F16H 7/18 474/111 |
| 8,007,385 B2* | 8/2011 | Hirayama | F16H 7/18 474/111 |
| 9,279,481 B2* | 3/2016 | Konno | F16H 7/18 |
| 2006/0040774 A1* | 2/2006 | Hirayama | F16H 7/18 474/111 |
| 2006/0172835 A1* | 8/2006 | Konno | F16H 7/18 474/111 |
| 2006/0199689 A1* | 9/2006 | Yoshimoto | F16H 7/18 474/111 |
| 2006/0205548 A1* | 9/2006 | Konno | F16H 7/18 474/111 |

FOREIGN PATENT DOCUMENTS

| JP | 2006-250208 A | 9/2006 |
|---|---|---|
| JP | 2009-36275 A | 2/2009 |

\* cited by examiner

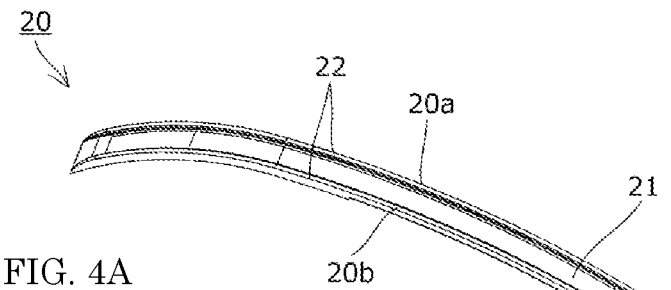
FIG. 4A
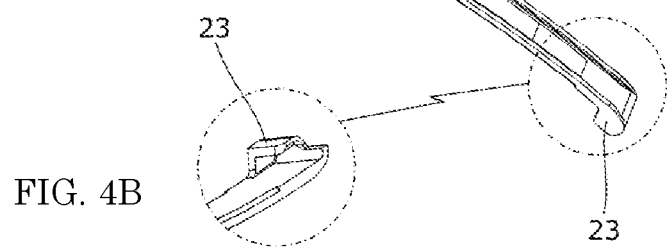
FIG. 4B
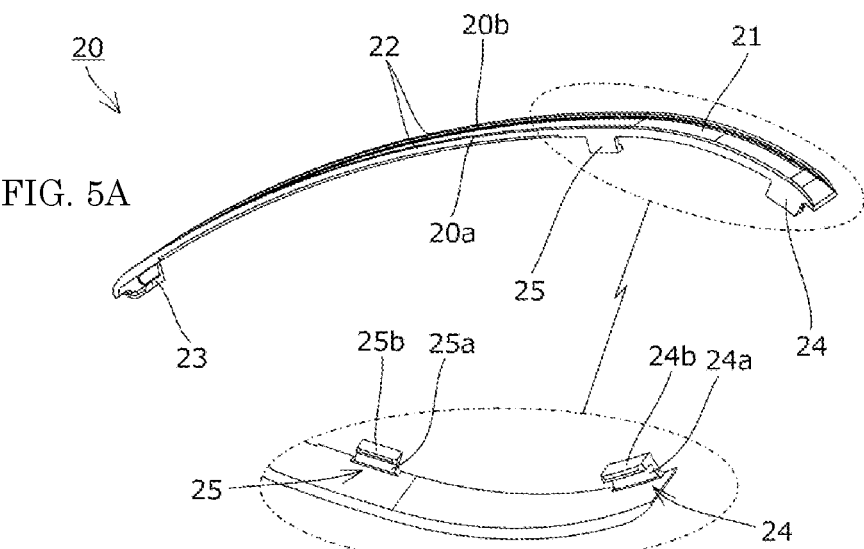
FIG. 5A
FIG. 5B

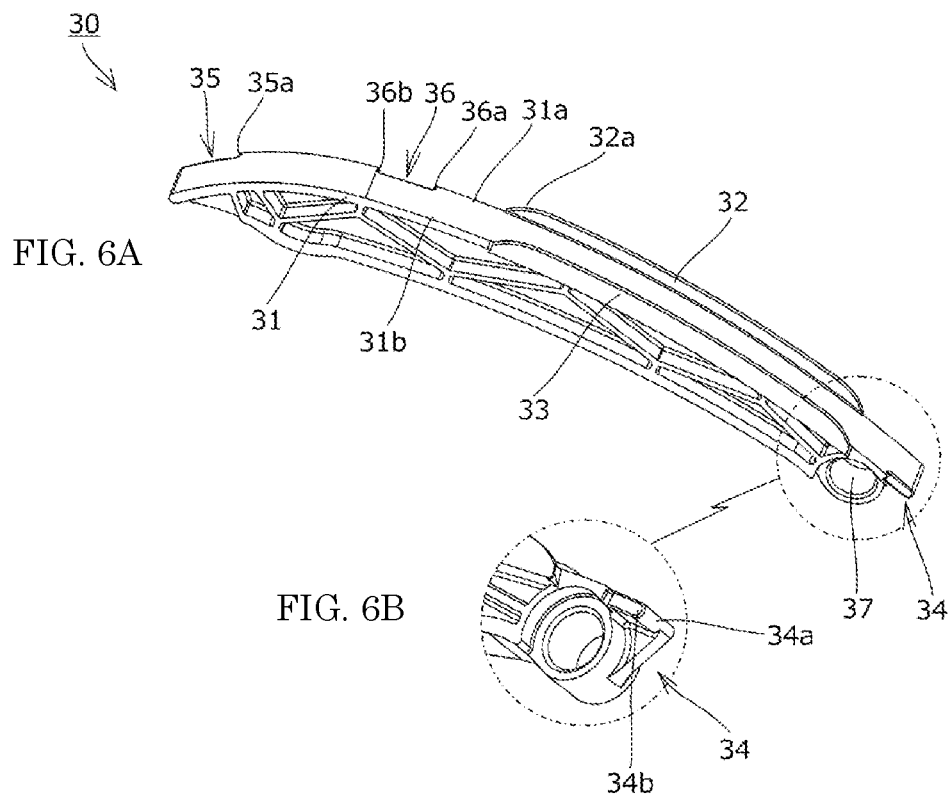
FIG. 6A
FIG. 6B
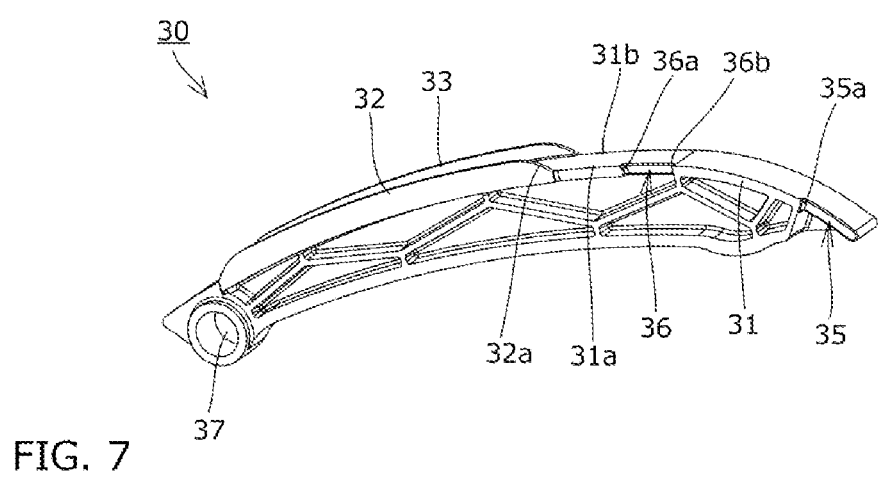
FIG. 7

CHAIN GUIDE

BACKGROUND OF THE INVENTION

1. Field of the Invention

The present invention relates to a chain guide having a guide shoe that slidably guides a running chain, and a base member that supports the guide shoe along a guide longitudinal direction.

2. Description of the Related Art

A chain guide has hitherto been known, which is incorporated in a timing system in the engine room of a car for slidably guiding a chain running between sprockets to keep an appropriate chain tension (see, for example, Japanese Patent Application Laid-open No. 2006-242357).

This chain guide described in Japanese Patent-Application Laid-open No. 2006-242357 is formed by a guide shoe that slidably guides the running chain,, and a base member that supports the guide shoe, and configured such that the guide shoe is removably attached to the base member by means of a plurality of hooks formed to the guide shoe and engaged with engagement portions of the base member.

In such a chain guide, it is also known to restrict sideway displacement of the guide shoe relative to the base member to achieve stable movement of the chain in sliding contact with the guide shoe, and also to provide side wall ribs on the upper face of the base member such as to stand on the left and right side edges in the guide width direction, for the purpose of enhancing the strength of the base member by utilising available space on the guide shoe side (see, for example, Japanese Patent Application Laid-open No. 2005-036275).

However, with side wall ribs formed on the left and right side edges of the base member as in the chain guide described in Japanese Patent Application Laid-open No. 2009-036275, part of the base member where the side wall ribs are formed cannot be utilized as the location for the hooks of the guide shoe to be engaged. Therefore, the location available for engagement of the hooks of the guide shoe is limited to the upstream side and downstream side relative to the side wall ribs of the base member.

In the chain guide described in Japanese Patent Application Laid-open No. 2009-036275, an upstream hook (chain entrance-side engaging portion) formed to the guide shoe is engaged with an upstream engagement portion (chain entrance-side engagement portion) formed at an upstream end of the base member, and a downstream hook (chain exit-side engaging portion) formed on a downstream side of the guide shoe is engaged with a downstream engagement portion (chain exit-side engagement portion) formed to the base member on a downstream side of the side wall ribs, so as to prevent the guide shoe from lifting up from the base member on the upstream side and downstream side of the side wall ribs. Movement of the guide shoe relative to the base member in a guide longitudinal direction is restricted such that movement of the guide shoe toward a downstream side relative to the base member is restricted by the engagement between the upstream hook and the upstream engagement portion, while movement of the guide shoe toward an upstream side relative to the base member is restricted by the engagement between an engagement recess formed in an upper face of the base member and a shoe-backside protrusion protruded on the underside of the guide shoe.

According to this chain guide described in Japanese Patent Application Laid-open No. 2009-036275, to attach the guide shoe to the base member, first, the downstream hook is hooked to the downstream engagement portion, and then the upstream hook is hooked to the upstream engagement portion, after which the guide shoe is moved toward the downstream side relative to the base member in order to insert the shoe-backside protrusion into the engagement recess.

SUMMARY OF THE INVENTION

However, in the chain guide described in Japanese Patent Application Laid-open No. 2009-036275, the direction in which the shoe-backside protrusion is attached to the engagement recess, and the direction in which movement of the shoe-backside protrusion is restricted by the engagement recess, are both along the guide longitudinal direction. The problem here is that it is difficult to achieve both of good attachability of the shoe-backside protrusion to the engagement recess and tightness when it is fitted therein.

Namely, in order to achieve good attachability of the shoe-backside protrusion to the engagement recess, it is desirable to design the recess and protrusion such that there will be some looseness between an upstream side end face of the shoe-backside protrusion and an upstream side end face of the engagement recess when the shoe-backside protrusion is fitted into the engagement recess. On the other hand, if there is too much looseness, the shoe-backside protrusion will tend to come off easily.

Also, depending on the form of the chain guide, it may be difficult to form the engagement recess in the upper face of the base member, or to provide a protrusion on the underside of the guide shoe.

Accordingly, an object of the present invention is to solve these problems and provide a chain guide that can readily achieve, with a simple structure, both of good attachability and tightness of a guide shoe relative to a base member, even though the base member has side wall ribs on both left and right side edges.

The present invention provides a chain guide including a guide shoe that slidably guides a running chain, and a base member that supports the guide shoe. The base member includes a first side wall rib formed on a first side edge in a guide width direction of the base member, a second side wall rib formed on a second side edge in the guide width direction of the base member, an upstream engagement portion formed one side of the first side wall rib in a guide longitudinal direction, and a downstream engagement portion formed to the first side edge, which is the other side of the first side wall rib in the guide longitudinal direction. The guide shoe includes an upstream hook engaging with the upstream engagement portion and a downstream hook engaging with the downstream engagement portion. The downstream engagement portion includes a restricting portion that restricts movement of the downstream hook toward an upstream side. The downstream hook is formed so as to be hooked to the downstream engagement portion from an outer side of the guide width direction by twisting and elastically deforming the guide shoe in a state where the upstream hook is engaged with the upstream engagement portion. The problems mentioned above are solved by these features.

The terms "upstream" and "downstream" in the invention, are terms for distinguishing one side and the other side of guide longitudinal direction, and do not mean upstream and downstream of a chain traveling direction, for example, the upstream hook and the upstream engagement portion may be provided on an inlet side of the chain guide for approaching the chain against the chain guide, on the contrary, the upstream hook and the upstream engagement portion may be provided on an outlet side of the chain guide.

According to the invention as set forth in claim 1, the base member includes a first side wall rib formed on a first side edge in a guide width direction of the base member, a second side wall rib formed on a second side edge in the guide width direction of the base member, an upstream engagement portion formed one side of the first side wall rib in a guide longitudinal direction, and a downstream engagement portion formed to the first side edge, which is the other side of the first side wall rib in the guide longitudinal direction. The guide shoe includes an upstream hook engaging with the upstream engagement portion and a downstream hook engaging with the downstream engagement portion. The downstream engagement portion includes a restricting portion that restricts movement of the downstream hook toward an upstream side. The downstream hook is formed so as to be hooked to the downstream engagement portion from an outer side of the guide width direction by twisting and elastically deforming the guide shoe in a state where the upstream hook is engaged with the upstream engagement portion.

Accordingly, the guide shoe can be attached to the base member with a simple operation. In addition,, while the direction in which the downstream hook is attached to the downstream engagement portion is along the guide width direction, the direction in which movement of the downstream hook is restricted by the restricting portion of the downstream engagement portion is along a guide longitudinal direction. Therefore, good attachability and tightness of the downstream hook relative to the downstream engagement portion can both be readily achieved with a simple structure.

According to the invention as set forth in claim 2, the first side wall rib includes at a downstream end a curved guide portion for guiding the guide shoe when the guide shoe is attached to the base member.

Accordingly, when the guide shoe is attached to the base member, the guide shoe rests on the first side wall rib, with the upstream hook being hooked to the upstream engagement portion. After that, the guide shoe is twisted and elastically deformed so that the downstream nook is hooked to the downstream engagement portion from an outer side of the guide width direction. When the guide shoe is twisted and elastically deformed, the guide shoe is guided by the curved guide portion so that the guide shoe can be guided smoothly onto the upper face of the base member. This way, any interference between the guide shoe and the downstream end of the first side wall rib is avoided, and the guide shoe is smoothly attached to the base member.

According to the invention as set forth in claim 3, the downstream end of the first side wall rib is formed at a position 0.3 L to 0.6 L away from a downstream end of the base member toward an upstream side, where L is a total length of the base member in the guide longitudinal direction. This way, while a certain length of the first side wall rib in the guide longitudinal direction is secured to increase the strength of the base member, there is provided an area where the first side wall rib is riot formed on the downstream side of the first side edge of the base member so that interference between the downstream end of the first side wall rib and the guide shoe is avoided, and therefore the downstream hook can be favorably engaged with the downstream engagement portion.

According to the invention as set forth in claim 4, the upstream engagement portion includes a first restricting portion that restricts movement of the upstream hook toward a downstream side, and a second restricting portion that restricts movement of the upstream hook toward the first side edge. When the guide shoe is twisted and elastically deformed, with the upstream hook being hooked to the upstream engagement portion, detachment of the upstream hook from the upstream engagement portion is prevented, so that the operation of attaching the guide shoe to the base member can be carried out in an easy and stable manner.

According to the invention as set forth in claim 5, the downstream engagement portion further includes a second restricting portion that restricts movement of the downstream hook toward a downstream side, whereby movement of the guide shoe in the guide longitudinal direction relative to the base member can be restricted even more reliably.

According to the invention as set forth in claim 6, the downstream engagement portion is formed as an indentation by indenting the first side edge of the base member inward in the guide width direction. The restricting portion that restricts movement of the downstream hook toward the upstream side, and the second restricting portion that restricts movement of the downstream hook toward the downstream side, can be readily formed only by indenting the first side edge inward in the guide width direction.

According to the invention as set forth in claim 7, a plurality of downstream engagement portions are formed at an interval along the guide longitudinal direction, and downstream hooks are formed in the same number as the downstream engagement portions at an interval in the guide longitudinal direction. Since the guide shoe is engaged with the base member at a plurality of locations on the downstream side of the first side wall rib, the guide shoe can be attached to the base member more firmly.

According to the invention as set forth in claim 8, one of a plurality of downstream hooks that is formed on a further downstream side has the hook portion larger in the guide width direction than that of the downstream hook that is formed on an upstream side. By thus adjusting the sizes of the hook portions of the plurality of downstream hooks in consideration of a twisting angle of the guide shoe when it is attached to the base member, the guide shoe can be attached to the base member firmly without compromising the easiness in engaging the downstream hook with the downstream engagement portion.

BRIEF DESCRIPTION OF THE DRAWINGS

FIGS. 4A and 4B are perspective views illustrating a guide shoe;

FIGS. 5A and 5B are perspective views illustrating the guide shoe seen from a different direction from that of FIG. 4A;

FIGS. 6A and 6B are perspective views illustrating a base member;

FIG. 7 is a perspective view illustrating the base member seen from a different direction from that of FIG. 6A;

DESCRIPTION OF THE PREFERRED EMBODIMENTS

A chain guide 10 according to one embodiment of the present invention will be hereinafter described with reference to the drawings.

Figure 1:
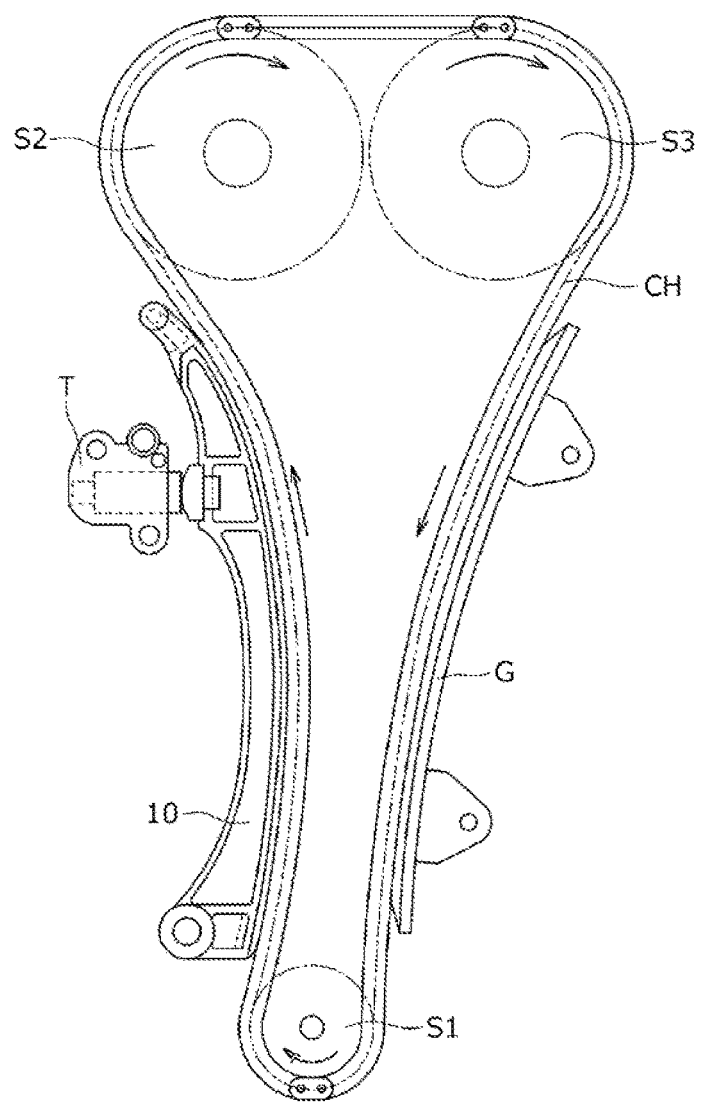
FIG. 1 is an explanatory diagram illustrating a timing system in which a chain guide according to one embodiment of the present invention is incorporated.

The chain guide 10 according to the first embodiment of the present invention is used as shown in FIG. 1 by being incorporated in a timing system installed in an engine room, and slidably guides a chain CH running between sprockets S1 to S3 to keep an appropriate chain tension. More specifically, the chain guide 10 guides the chain CH passing over the sprockets SI, and S2 and S3 respectively provided to a crankshaft and cam shafts to stabilize the running chain CH, and keeps the tension of the chain CH appropriately by being pressed by a tensioner T against the chain CH. While the chain guide 10 is configured as a pivot guide pivotally supported inside the engine room in this embodiment, the chain guide 10 may be configured as a fixed guide G fixedly installed in the engine room.

Figure 2:
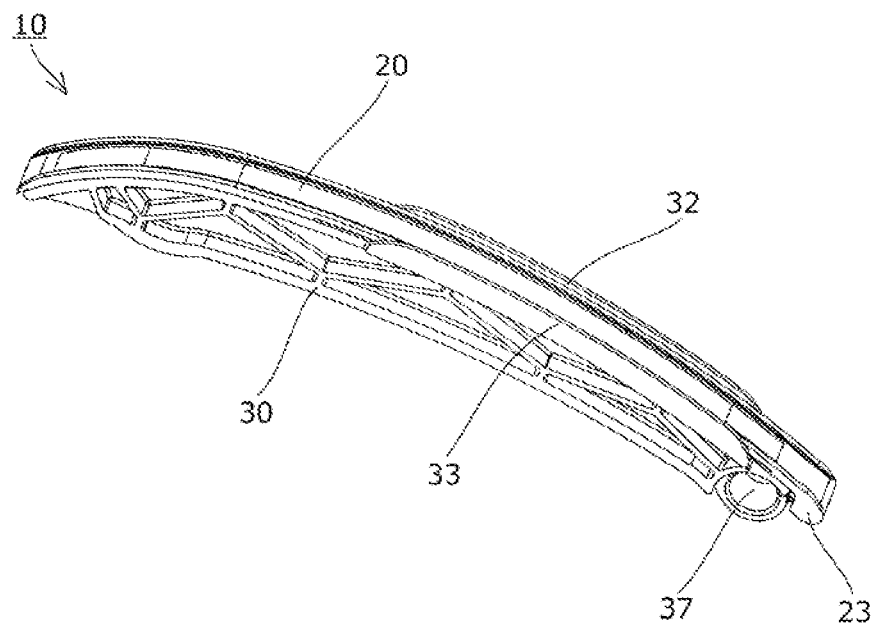
FIG. 2 is a perspective view illustrating the chain guide.
Figure 3:
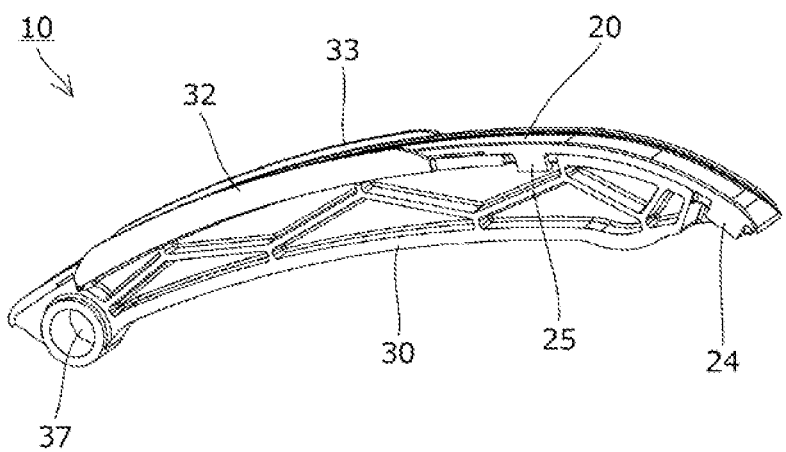
FIG. 3 is a perspective view illustrating the chain guide seen from a different direction from that of FIG. 2.

The chain guide 10 includes, as shown in FIG. 2 and FIG. 3, a guide shoe 20 for slidably guiding the running chain CH along a guide longitudinal direction, and a base member 30 that is removably attached to the guide shoe 20 and supports the guide shoe 20.

The guide shoe 20 includes, as shown in FIG. 4A and FIG. 5A, a guide surface 21 extending along the guide longitudinal direction on the side that faces the chain CH, and guide sections 22 on upper faces of right side edge 20a and left side edge 20b in a width direction of the guide shoe 20.

The guide shoe 20 includes, as shown in FIG. 2 to FIG. 5A and 5B, an upstream hook 23 to engage with an upstream engagement portion 34 of the base member 30, a first downstream hook 24 to engage with a first downstream engagement portion 35 of the base member 30, and a second downstream hook 25 to engage with a second downstream engagement portion 36 of the base member 30.

The upstream hook 23 is formed on the underside of the guide shoe 20 at the upstream end of the guide shoe 20 as shown in FIGS. 4A and FIG. 4B and FIG. 5A, and configured to be hooked to the upstream engagement portion 34 from the upstream side so that the upstream hook 23 is stopped from lifting up from the upstream engagement portion 34.

The first downstream hook 24 is formed on the underside of the right side edge 20a of the guide shoe 20 near the downstream end of the guide shoe 20 as shown in FIG. 5A, and configured to be hooked to the first downstream engagement portion 35 from an outer side in the guide width direction so that the first downstream hook 24 is stopped from lifting up from the first downstream engagement portion 35.

The second downstream hook 25 is formed on the underside of the right side edge 20a of the guide shoe 20 upstream of the first downstream hook 24 as shown in FIGS. 5A and 5B, and configured to be hooked to the second downstream engagement portion 36 from an outer side in the guide width direction so that the second downstream hook 25 is stopped from lifting up from the second downstream engagement portion 36.

The downstream hooks 24 and 25 have base portions 24a and 25a extending downward from the underside of the guide shoe 20, and hook portions 24b and 25b extending inward in the guide width direction from the lower ends of the base portions 24a and 25a, as shown in FIGS. 5A and 5B. The hook portion 24b of the first downstream hook 24 formed downstream of the second downstream hook 25 is larger in the guide width direction than the hook portion 25b of the second downstream hook 25 formed upstream of the former.

The base member 30 includes, as shown in FIGS. 6A and 6B and FIG. 7, a shoe support plate 31 curved along the guide longitudinal direction to support the guide shoe 20, a right side wall rib 32 standing on the upper face of the right side edge 31a in the guide width direction of the shoe support plate 31, a left side wall rib 33 standing on the upper face of the left side edge 31b in the guide width direction of the shoe support plate 31, an upstream engagement portion 34 formed upstream of the right side wall rib 32, a first downstream engagement portion 35 and a second downstream engagement portion 36 formed downstream of the right side wall rib 32, and an attachment hole 37 formed at the upstream end for letting a bolt or the like protruding from an engine block to pass through.

The right side wall rib 32 is formed with a curved guide portion 32a at the downstream end thereof that is curved to smoothly connect to the upper face of the shoe support plate 31 on the downstream side, as well as a curved portion at the upstream end thereof that is curved to smoothly connect to the upper face of the shoe support plate 31 on the upstream side, as shown in FIG. 6A and FIG. 7.

Similarly, the left side wall rib 33 is formed with a curved portion at the downstream end thereof that is curved to smoothly connect to the upper face of the shoe support plate 31 on the downstream side, as well as a curved portion at the upstream end thereof that is curved to smoothly connect to the upper face of the shoe support plate 31 on the upstream side.

There are areas where no side wall ribs 32 and 33 are formed on the upstream and downstream sides of the left side edge 31b and right side edge 31a.

The upstream engagement portion 34 is formed at the upstream end of the base member 30, as shown in FIG. 6A and 6B. The upstream engagement portion 34 in a state being engaged with the upstream hook 23 includes a first restricting portion 34a that restricts movement of the upstream hook 23 toward the downstream side, and a second restricting portion 34b that restricts movement of the upstream hook 23 toward the right side edge 31a.

The first downstream engagement portion 35 is formed by indenting the right side edge 31a inwardly in the guide width direction near the downstream end of the right side edge 31a, as shown in FIG. 6A and FIG. 7.

The inner side face on the upstream side of the first downstream engagement portion 35 in a state of being engaged with the first downstream hook 24 functions as a first restricting portion 35a that restricts movement of the first downstream hook 24 toward the upstream side.

The second downstream engagement portion 36 is formed by indenting the right side edge 31a inwardly in the guide width direction at a point upstream of the first downstream engagement portion 35, as shown in FIG. 6A and FIG. 7.

The inner side face on the upstream side of the second downstream engagement portion 36 functions as a first-restricting portion 36a that restricts movement of the second downstream hook 25 engaged therewith toward the upstream side, and the inner side face on the downstream side of the second downstream engagement portion 36 functions as a second restricting portion 36b that restricts movement of the second downstream hook 25 toward the downstream side.

Next, how the guide shoe 20 is attached to the base member 30 will be described with reference to FIG. 8 and FIG. 9.

Figure 8:
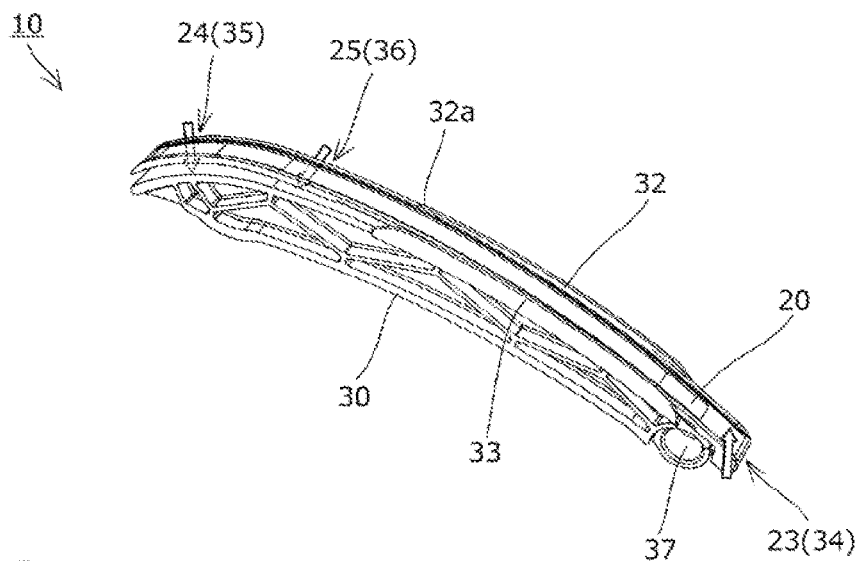
FIG. 8 is a perspective view illustrating the guide shoe, part way through being attached to the base member.
Figure 9:
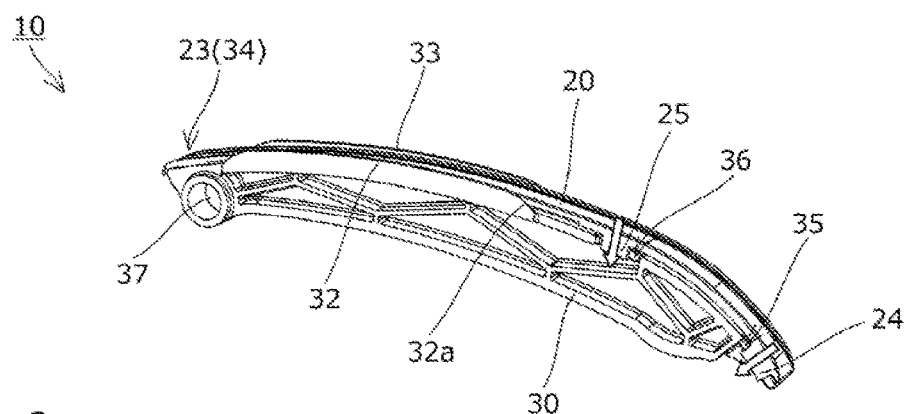
FIG. 9 is a perspective view illustrating the guide shoe, part way through being attached to the base member as seen from a different direction from that of FIG. 8.

When attaching the guide shoe 20 to the base member 30, first, as shown in FIG. 8, the upstream hook 23 of the guide shoe 20 is hooked to the upstream engagement portion 34 of the base member 30 from the upstream side (more specifically, in a direction from the left side edge 31b toward the right side edge 31a). In this state where the upstream hook 23 is engaged with the upstream engagement portion 34, the guide shoe 20 rests on the right side wall rib 32.

Next, with the guide shoe 20 resting on the right side wall rib 32, the guide shoe 20 is slightly twisted and elastically deformed, so that the first downstream hook 24 and second downstream hook 25 are hooked to the first downstream engagement portion 35 and second downstream engagement portion 36 from an outer side in the guide width direction.

At this time, the guide shoe 20 that was resting on the right side wall rib 32 is guided onto the upper face of the shoe support plate 31 by the curved guide portion 32a formed at the downstream end of the right side wall rib 32, when the guide shoe 20 is twisted and thereby elastically deformed so that the downstream hooks 24 and 25 are hooked to the downstream engagement portions 35 and 36.

The downstream end of the right side wall rib 32 should preferably be formed at a position 0.3 L to 0.6 L away from the downstream end of the base member 30 (right side edge 31a) toward the upstream side, where L is the entire length of the base member 30 along the guide longitudinal direction. This way, a certain length of the right side wall rib 32 in the guide longitudinal direction is secured to increase the strength of the base member 30, as well as good attachability/removability of the downstream hooks 24 and 25 relative to the downstream engagement portions 35 and 36 is achieved, since there is an area where the right side wall rib 32 is not formed on the downstream side of the right side edge 31a of the base member 30 so that interference between the downstream end of the right side wall rib 32 and the guide shoe 20 is avoided.

While one embodiment of the present invention has been described in detail, the present invention is not limited to the above-described embodiment and may be carried out with various design changes without departing from the scope of the present invention set forth in the claims.

For example, the material of the guide shoe may be selected from known suitable materials in accordance with various conditions such as elasticity, friction resistance, rigidity, durability, formability, cost, and so on. Synthetic resin materials are particularly suitable.

The material of the base member may be selected from metal materials or synthetic resin materials as appropriate in accordance with various conditions such as rigidity, durability, formability, cost, and so on.

In the embodiment described above, the first side wall rib and second side wall rib are formed to have the same size and to be located at the same position in the guide longitudinal direction. Instead, the size and position of the first side wall rib and second side wall rib may be differed along the guide longitudinal direction.

In the embodiment described above, two each downstream hooks and downstream engagement portions are formed, but the specific number of the downstream hooks and downstream engagement portions may be one or three or more.

In the embodiment described above, the first restricting portion that restricts movement of the downstream hook toward the upstream side is formed to both of the first downstream engagement portion and second downstream engagement portion. Instead, if a plurality of downstream engagement portions are provided, only one of the downstream engagement portions may have the first restricting portion.

In the embodiment described above, the second restricting portion that restricts movement of the downstream hook toward the downstream side is formed to the second downstream engagement portion. The second restricting portion, however, may be formed to any of the downstream engagement portions. For example, the second restricting portion may be formed also to the first downstream engagement portion. Alternatively, the second restricting portion may be omitted.

In the embodiment described above, the downstream engagement portion is formed by indenting the right side edge inward in the guide width direction, and the inner side face on the upstream side of the downstream engagement portion is used as the first restricting portion that restricts movement of the downstream hook toward the upstream side, while the inner side face on the downstream side of the downstream engagement portion is used as the second restricting portion that restricts movement of the downstream hook toward the downstream side. However, the specific form of the first restricting portion or second restricting portion is not limited to the one described above. They may be formed in any way as long as they restrict movement of the downstream hook(s) with the upstream hook engaged with the upstream engagement portion.

In the embodiment described above, a first side edge and a second side edge were described as the right side edge and the left side edge, respectively, and a first side wall and a second side wall were described as the right side wall rib and the left side wall rib, respectively. Instead, the first side edge and the second side edge may be designed as the left side edge and the right side edge, respectively, and the first side wall and the second side wall may be designed as the left side wall rib and the right side wall rib, respectively.

What is claimed is:

1. A chain guide comprising a guide shoe that slidably guides a running chain, and a base member that supports the guide shoe,
   the base member including a first side wall rib formed on a first side edge in a guide width direction of the base member, a second side wall rib formed on a second side edge in the guide width direction of the base member, an upstream engagement portion formed one side of the first side wall rib in a guide longitudinal direction, and a downstream engagement portion formed to the first side edge, which is the other side of the first side wall rib in the guide longitudinal direction,
   the guide shoe including an upstream hook engaging with the upstream engagement portion and a downstream hook engaging with the downstream engagement portion,
   the downstream engagement portion including a restricting portion that restricts movement of the downstream hook toward an upstream side, and
   the downstream hook being formed so as to be hooked to the downstream engagement portion from an outer side in the guide width direction by twisting and elastically deforming the guide shoe in a state where the upstream hook is engaged with the upstream engagement portion.

2. The chain guide according to claim 1, wherein the first side wall rib includes at a downstream end a curved guide portion for guiding the guide shoe when the guide shoe is attached to the base member.

3. The chain guide according to claim 1, wherein
the downstream end of the first side wall rib is formed at a position 0.3 L to 0.6 L away from a downstream end of the base member toward an upstream side, where L is a total length of the base member in a guide longitudinal direction.

4. The chain guide according to any claim 1, wherein the upstream engagement portion includes a first restricting portion that restricts movement of the upstream hook toward a downstream side, and a second restricting portion that restricts movement of the upstream hook toward the first side edge.

5. The chain guide according to claim 1, wherein the downstream engagement portion further includes a second restricting portion that restricts movement of the downstream hook toward a down stream side.

6. The chain guide according to claim 5, wherein the downstream engagement portion is formed as an indentation by indenting the first side edge of the base member inward in the guide width direction.

7. The chain guide according to claim 1, wherein
a plurality of downstream engagement portions are formed at an interval along the guide longitudinal direction, and
downstream hooks are formed in the same number as the downstream engagement portions at an interval in the guide longitudinal direction.

8. The chain guide according to claim 1, wherein
the downstream hook includes a base portion extending downward from an underside of the guide shoe and a hook portion extending inward in the guide width direction from a lower end of the base portion, and
one of a plurality of downstream hooks that is formed on a further downstream side has the hook portion larger in the guide width direction than that of the downstream hook that is formed on an upstream side.

* * * * *